N. H. Borgfeldt.
Granulating Tobacco.
Nº 68,597.  Patented Sept. 10, 1867.
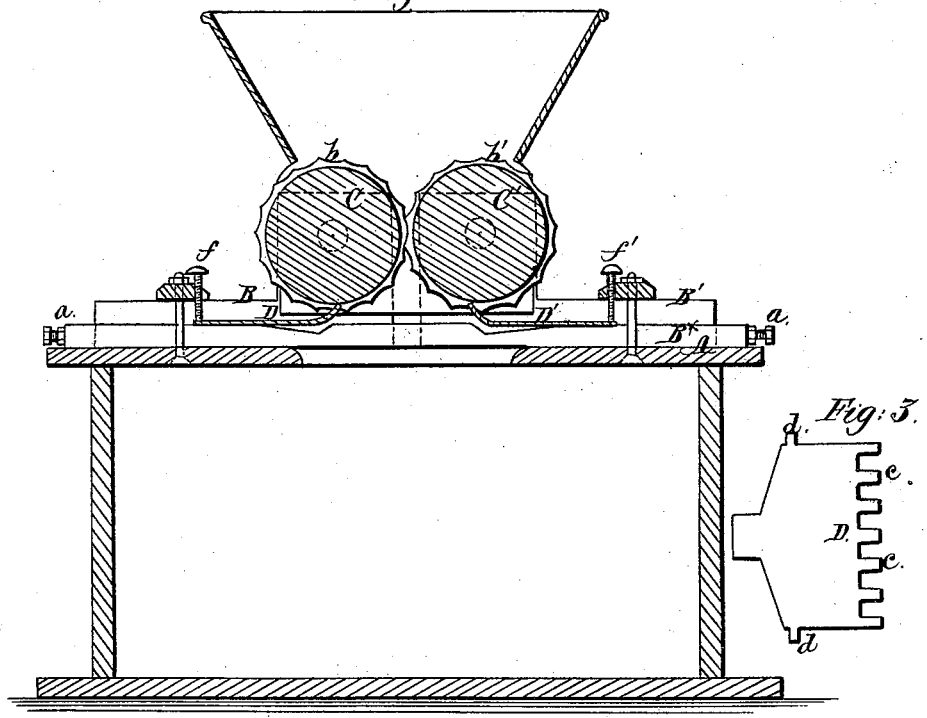
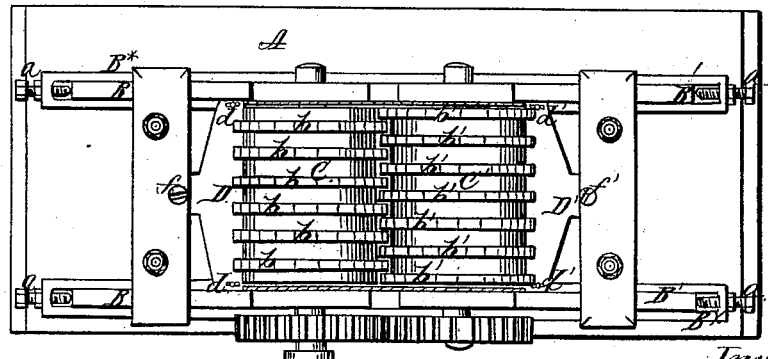
Witnesses: Gustav Berg, N. H. Dryburgh
Inventor: Nicholas H. Borgfeldt
pr Van Sartwood & Hauff
Attys

UNITED STATES PATENT OFFICE.

NICHOLAS H. BORGFELDT, OF NEW YORK, N. Y.

IMPROVEMENT IN APPARATUS FOR BREAKING THE STEMS AND LEAVES OF TOBACCO.

Specification forming part of Letters Patent No. 68,597, dated September 10, 1867.

*To all whom it may concern:*

Be it known that I, NICHOLAS H. BORGFELDT, of New York, 52 Cedar street, in the county and State of New York, have invented a new and Improved Apparatus for Breaking the Stems and Leaves of Tobacco and other Substances; and I do hereby declare that the following is a full, clear, and exact description thereof, which will enable those skilled in the art to make and use the same, reference being had to the accompanying drawing, forming part of this specification, in which drawing—

Figure 1 represents a longitudinal vertical section of this invention. Fig. 2 is a plan or top view of the same. Fig. 3 is a detached plan of one of the comb-shaped scrapers.

Similar letters indicate corresponding parts.

This invention consists in the arrangement of two crushing-rollers, with sharp-edged circular projections or ribs, which are scalloped on their peripheries, in combination with comb-shaped scrapers, the teeth of which fit between the projections of the crushing-rollers, and which are adjustable by set-screws in such a manner that by the action of the scalloped circular ribs the stems of tobacco, as well as the leaves or other articles passed through between said rollers, are broken and reduced to small particles, and by the action of the comb-shaped scrapers the crushing-faces are kept clear and in proper working order.

A represents a frame, made of wood or any other suitable material, and provided on its top with two grooved ways, B*, capable of receiving the standards B B', which form the bearings for the crushing-rollers C C'. The standards B B' may be made adjustable by set-screws $a$, so that the crushing-faces can be set closer together or farther apart to suit the work.

The crushing-faces of the rollers are composed of a series of circular sharp-edged ribs, $b$ $b'$, which are so situated that they interchange—that is to say, that the ribs of one roller fit into the intervening grooves of the other roller, and vice versa. The peripheries of the ribs $b$ $b'$ are scalloped, as clearly shown in Fig. 1, so as to form a series of sharp points, which serve to break up in one direction the stems of tobacco, as well as the leaves or any other dry article, such as coffee, passing through between the rollers. At the same time the edges of the ribs, as the same pass each other, act like circular shears, cutting or breaking such stems, leaves, or other articles in a direction at right angles to that in which they are broken by the points of said ribs, and by these means the stems and leaves of tobacco, or other articles to be broken, are separated into small particles, the size of which depends upon the coarseness of the ribs and scallops. By passing the articles to be crushed repeatedly through the rollers they may be ground up to any desired fineness.

Under the crushing-rollers are situated the comb-shaped scrapers D D', which are provided with teeth $c$ $c$, fitting between the ribs of the crushing-rollers.

From the edges of the comb-shaped scrapers project lugs or ears $d$ $d'$, which rest upon the grooved ways of the frame and form the fulcra of said scrapers. The tail ends of the scrapers are exposed to the action of set-screws $f f'$, and by means of these set-screws the teeth of the scrapers can be made to bear against the crushing-surfaces with more or less power. By the action of the scrapers the crushing-surfaces are kept clean and in proper working order.

This apparatus is intended particularly for granulating tobacco, and it has the great advantage over other machines now used for this purpose that it breaks the stems as well as the leaves, and no portion of the tobacco is lost.

I am aware that crushing-rollers have been used for breaking up articles of different kinds; but such rollers would not serve my purpose on account of the shape of their crushing-faces. I do not claim, broadly, therefore, the use of crushing-rollers for breaking the stems and leaves of tobacco independent of the particular shape of the crushing-surfaces.

What I claim as new, and desire to secure by Letters Patent, is—

The scalloped sharp-edged circular ribs $b$ $b'$ on the rollers C C', in combination with the comb-shaped scrapers D D', substantially as and for the purpose set forth.

This specification signed this 22d day of July, 1867.

NICHOLAS H. BORGFELDT.

Witnesses:
W. HAUFF,
GUSTAV BERG.